United States Patent
Sanguinetti (10) Patent No.: US 8,432,836 B2
(45) Date of Patent: Apr. 30, 2013

(54) WIRELESS CIRCUITRY WITH SIMULTANEOUS VOICE AND DATA CAPABILITIES AND REDUCED INTERMODULATION DISTORTION

(75) Inventor: Louie J. Sanguinetti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 12/942,937

(22) Filed: Nov. 9, 2010

(65) Prior Publication Data

US 2012/0113874 A1 May 10, 2012

(51) Int. Cl.
 *H04B 7/005* (2006.01)
(52) U.S. Cl.
 USPC .......................................................... 370/278
(58) Field of Classification Search .................. None
 See application file for complete search history.

(56) References Cited

U.S. PATENT DOCUMENTS

| | | | |
|---|---|---|---|
| 5,896,563 A | 4/1999 | Kawanami et al. | |
| 6,643,522 B1 | 11/2003 | Young | |
| 7,092,684 B2 | 8/2006 | Szopko et al. | |
| 7,602,333 B2 | 10/2009 | Hiramatsu et al. | |
| 7,801,493 B2 | 9/2010 | Do | |
| 2004/0137947 A1* | 7/2004 | Nimmo-Smith | 455/561 |
| 2005/0227631 A1* | 10/2005 | Robinett | 455/83 |
| 2008/0169878 A1* | 7/2008 | Resnati et al. | 333/1.1 |
| 2008/0212500 A1* | 9/2008 | Zhen et al. | 370/277 |
| 2008/0253345 A1* | 10/2008 | Sanguinetti | 370/339 |
| 2010/0189031 A1* | 7/2010 | Kanou | 370/328 |
| 2010/0296419 A1* | 11/2010 | Kim et al. | 370/297 |
| 2011/0051628 A1* | 3/2011 | Cohen et al. | 370/278 |
| 2011/0158081 A1* | 6/2011 | Wang et al. | 370/201 |
| 2011/0212696 A1* | 9/2011 | Hahn et al. | 455/83 |

* cited by examiner

*Primary Examiner* — Chirag Shah
*Assistant Examiner* — Amar Persaud
(74) *Attorney, Agent, or Firm* — Treyz Law Group; G. Victor Treyz; Jason Tsai (57) ABSTRACT

An electronic device has wireless communications circuitry that includes transmitters and receivers. The transmitters and receivers may share an antenna. Transmitted signals from multiple transmitters may be merged using a combining circuit. Merged signals from the transmitter may be conveyed to the antenna through a circulator. The circulator may route incoming signals from the antenna to receivers. The receivers may be coupled to the circulator through a filter. An additional filter may be interposed between the circulator and the antenna. An additional transmitter may transmit signals through the antenna using the additional filter. An additional receiver may receive some of the incoming signals that are received by the antenna through the additional filter.

20 Claims, 6 Drawing Sheets

| BAND NAME | TX FREQUENCY RANGE | RX FREQUENCY RANGE |
| --- | --- | --- |
| B13 | 777-787 MHz | 746-756 MHz |
| BCØ | 824-849 MHz | 869-894 |
| BC1 | 1850-1910 MHz | 1930-1990 MHz |

FIG. 6

WIRELESS CIRCUITRY WITH SIMULTANEOUS VOICE AND DATA CAPABILITIES AND REDUCED INTERMODULATION DISTORTION

BACKGROUND

This relates generally to wireless communications circuitry, and more particularly, to circuitry in wireless electronic devices that allows communications bands for voice and data to be simultaneously operated without producing excessive interference.

Electronic devices such as cellular telephones contain wireless circuitry that is capable of handling a variety of cellular telephone communications bands. These bands may include bands that support communications protocols that are associated with voice telephone calls. The bands handled by a device may also support communications protocols associated with data communications.

It can be challenging to operate the wireless circuitry in an electronic device in more than one band at a time due to the potential for interference. Not all wireless components perform ideally. For example, filter components may exhibit nonlinearities that can give rise to intermodulation distortion when signals associated with multiple communications bands are simultaneously active. Interference from intermodulation distortion and other effects may make it difficult or impossible to satisfy desired performance criteria in a device. For example, the level of interference that is produced when attempting to simultaneously operate certain voice and data bands in a device may calls to be dropped or may reduce data transfer rates to undesirably low levels.

It would therefore be desirable to be able to provide wireless communications circuitry that satisfactorily handles multiple communications bands of interest such as bands associated with voice and data communications.

SUMMARY

An electronic device may be provided with wireless communications circuitry. The wireless communications circuitry may include radio-frequency transmitters and receivers for handling wireless communications. The transmitters and receivers may share an antenna.

A circulator and filtering circuitry may be used to route signals from the transmitters to the antenna. Incoming signals that have been received by the antenna from an external source may be routed to the receivers by the circulator and filtering circuitry.

The circulator and filtering circuitry may include components such as bandpass filters, duplexers, diplexers, and combiners formed from passive components.

With one suitable arrangement, there are at least first, second, and third transmitters in the wireless communications circuitry and at least first, second, and third receivers in the wireless communications circuitry. Each transmitter may transmit radio-frequency signals in a different respective transmit communications band and each receiver may receiver radio-frequency signals in a different respective receive communications band.

Signals from the first and second transmitters may be merged onto a path that is coupled to the circulator using a duplexer, using a pair of respective bandpass filters and a passive combiner such as a Wilkinson splitter, using a pair of respective bandpass filters and a diplexer, or using other signal multiplexing circuitry. The circulator may have first, second, and third ports. The merged signals from the first and second transmitters may be received at the first port of the circulator and may be supplied to the antenna at the second port of the circulator.

Incoming signals from the antenna may be routed from the second port to the third port by the circulator. The first and second receivers may receive the incoming signals from the third port of the circulator. A filter circuit such as a duplexer may be used to divide the signals from the third port into a first path for the first receiver and a second path for the second receiver.

A diplexer or other filter may be interposed between the second port of the circulator and the antenna. The diplexer may route some incoming signals to the circulator and may route some incoming signals to an additional duplexer. The additional duplexer may be used to couple the third transmitter and the third receiver to the diplexer.

Further features of the invention, its nature and various advantages will be more apparent from the accompanying drawings and the following detailed description of the preferred embodiments.

DETAILED DESCRIPTION

Figure 1:
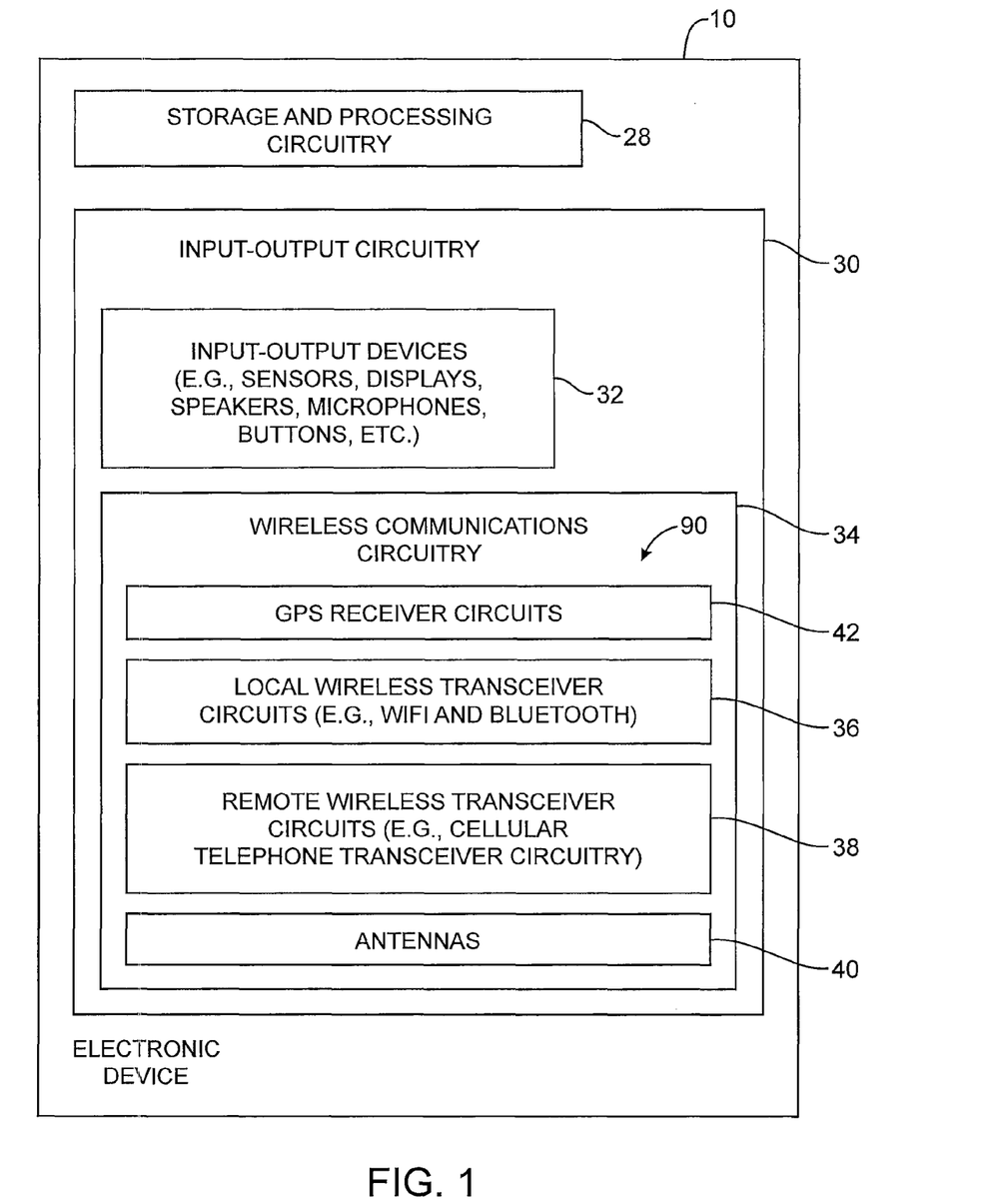
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands.

Device 10 may support one or more different cellular telephone standards. Examples of cellular telephone standards that may be supported by device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

Different cellular telephone standards may be implemented using different respective cellular telephone protocols. In a device that supports more than one cellular telephone standard, multiple protocols may be implemented. The cellular bands that are used in device 10 are sometimes given names that are associated with particular protocols. For example, communications (e.g., data communications) that involve the LTE cellular telephone standard may be handled using LTE bands. The LTE bands are numbered (e.g., Band 1, Band 2, Band 3, etc.) and are sometimes referred to as E-UTRA operating bands. As another example, communications (e.g., voice communications) that involve the CDMA 2000 cellular telephone standard may be handled using CDMA 2000 bands. The CDMA 2000 bands are sometimes referred to as band classes (e.g., band class 0, band class 1, etc.). Certain bands (i.e., LTE bands and CDMA band classes) are sometimes described herein as examples. In general, however, device 10 may communicate using radio-frequency signals of any suitable frequency.

In a typical device configuration, one, two, or more than two different cellular telephone standards may be supported. In configurations where multiple cellular telephone standards are supported, it may be desirable to operate device 10 while simultaneously using multiple different communications protocols. Illustrative configurations in which voice calls may be handled using a protocol such as the CDMA 2000 protocol and in which data communications may be handled using a protocol such as the LTE protocol are sometimes described herein as an example. This type of arrangement may allow a user to simultaneously hold a voice conversation (using a CDMA 2000 voice link) while handling data communications (using an LTE link). This type of configuration is, however, merely illustrative. Device 10 may support any suitable number of cellular telephone standards and may perform any suitable number of simultaneous communications activities.

When a device such as device 10 is operating using multiple different communications frequencies simultaneously, there is a potential for interference. For example, if signals are being conveyed simultaneously in multiple nearby cellular telephone bands, there is a potential for intermodulation distortion and other interference. Intermodulation distortion may arise due to the nonlinear behavior of filters and other wireless components. If care is not taken, interference can cause calls to be dropped and data communications to be disrupted.

To ensure that the operation of the wireless circuitry of device 10 is not impeded by interference, device 10 preferably includes wireless circuitry that mitigates the effects of intermodulation distortion by creating sufficient isolation between nearby communications band. Components such as circulators, bandpass filters, duplexers, and diplexers may be used to enhance isolation. These components may be included in wireless communications circuitry 34 of device 10.

As shown in FIG. 1, wireless communications circuitry 34 may form part of input-output circuitry 30 in device 10. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals.

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 700 MHz, 850 MHz, 900 MHz, 1800 MHz, 1900 MHz, and 2100 MHz and other bands (as examples). Circuitry 38 may handle voice data and non-voice data.

Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in device 10 in which multiple redundant antennas are used in handling communications for a particular band or bands. In an antenna diversity scheme, storage and processing circuitry 28 may select which antenna to use in real time based on signal strength measurements or other data. In multiple-input-multiple-output (MIMO) schemes, multiple antennas may be used to transmit and receive multiple data streams, thereby enhancing data throughput.

Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband modules, application specific integrated circuits, etc.

Storage and processing circuitry 28 may be used to run software on device 10, such as internet browsing applications, email applications, media playback applications, operating system functions, functions related to communications band selection during radio-frequency transmission and reception operations, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth° protocol, cellular telephone protocols, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or storage and processing circuitry in input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Figure 2:
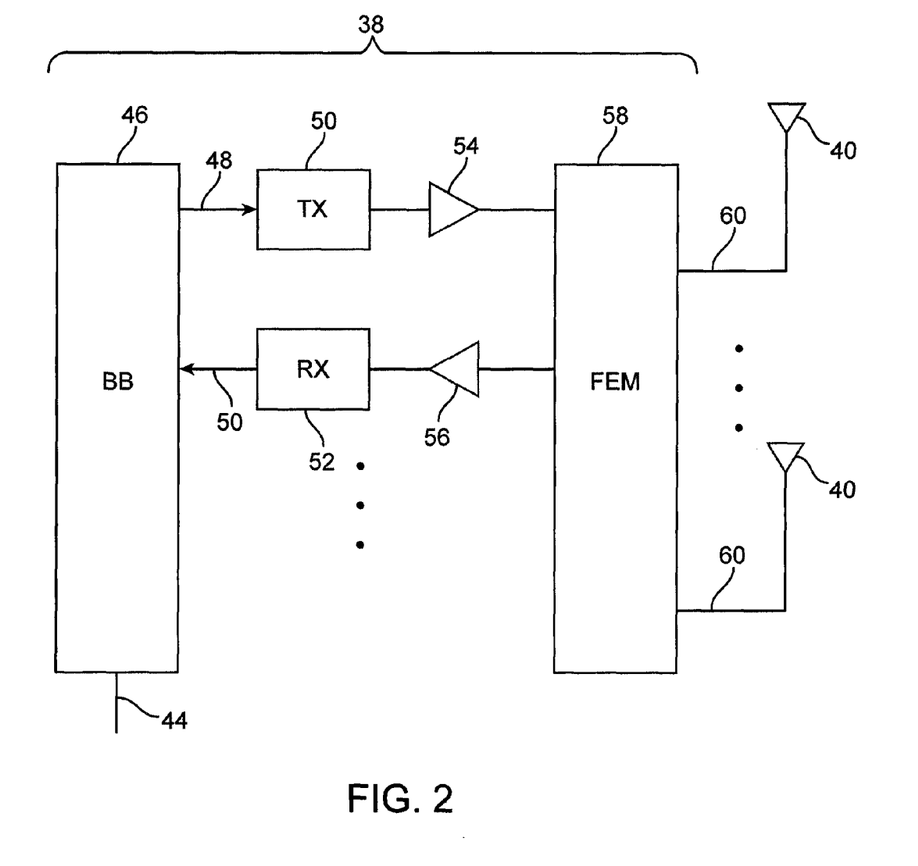
FIG. 2 is a diagram showing how radio-frequency transceiver circuitry may be coupled to one or more antennas within an electronic device of the type shown in FIG. 1 in accordance with an embodiment of the present invention.

Illustrative cellular telephone transceiver circuitry 38 and antennas 40 that may be used in wireless communications circuitry 34 of FIG. 1 are shown in FIG. 2. As shown in FIG. 2, cellular telephone transceiver circuitry 38 may be coupled to one or more antennas 40 using respective transmission lines 60. Transmission lines 60 may include coaxial cables, microstrip transmission line structures, stripline transmission lines structures, combinations of transmission lines of these types, or other suitable transmission lines. Front-end module 58 or other suitable circuitry may be used to connect multiple power amplifiers such as power amplifier 54 and multiple low noise amplifiers such as low noise amplifier 56 to antennas 40. Front-end module 58 may include switches, filtering circuitry, matching networks, and other circuits that form an interface between antennas 40 and amplifiers such as amplifiers 54 and 56.

There may be multiple power amplifiers 54 and multiple low noise amplifiers 56 in circuitry 38. For example, each communications band or part of a communications band may have a respective power amplifier and a respective low noise amplifier. Power amplifiers 54 may be used to increase the strength of transmitted radio-frequency signals before these signals are transmitted over the air using antennas 40. Low noise amplifiers 56 may be used to increase the strength of incoming radio-frequency signals that have been received from external sources using antennas 40.

Circuitry in device 10 such as storage and processing circuitry 28 may generate and consume data (including voice data for voice calls and non-voice data). Digital data that is to be transmitted may be provided to a circuit such as baseband module 46 at path 44 (e.g., from a microprocessor or other storage and processing circuitry 28). Baseband module 46 may modulate these signals in accordance with a desired cellular telephone standard and modulation scheme and may provide corresponding output signals on an appropriate path (path 48) for transmission by a corresponding transmitter (transmitter 50). Transmitter 50 may generate corresponding radio-frequency signals that are amplified by power amplifier 54 and transmitted over antenna(s) 40. When incoming radio-frequency signals are received by antenna(s) 40, these signals may be amplified using low noise amplifier 56 and passed to a corresponding receiver 52. The receiver may use path 50 to provide corresponding demodulated output to baseband module 46. Baseband module 46 may provide corresponding digital data signals on path 44.

When transmitting wireless signals using the wireless circuitry of FIG. 2, baseband module 46 may select an appropriate output path 48 and transmitter 50 based on which communications band is being used. If, for example, a first band is being used such as a band associated with a voice telephone call, baseband module 46 may supply its output to a first output path and a first transmitter. If, however, a second band is being used such as a band associated with a data transmission activity, baseband module 46 may supply its output to a second output path and second corresponding transmitter. Receiver selection may also be adjusted depending on band usage. For example, if incoming radio-frequency signals that are associated with one band are being received, a first of receivers 52 may be used, whereas a second of receivers 52 may be used when incoming radio-frequency signals are being received that are associated with another band.

The filter and switching circuitry of front-end module 58 of FIG. 2 can ensure that transmitted signals and received signals are routed between antenna(s) 40 and appropriate transmit and receive paths in transceiver circuitry 38. To minimize space, it may be desirable, for example, to route transmitted signals and received signals for multiple communications bands through a common antenna. For example, it may be desirable to transmit signals for multiple communications bands and to receive signals for multiple communications bands using the same antenna. This scheme may be applied in devices that include one antenna or multiple antennas. In systems that include multiple antennas, each of the multiple antennas may be shared between multiple respective communications bands, rather than dedicating a different antenna to each band.

In systems that support simultaneous use of multiple bands (e.g., to support a simultaneous voice telephone call and data communications link), there is a potential for nearby bands to be in simultaneous use. Particularly in a system with a shared antenna, this can lead to the potential for signal interference.

Figure 3:
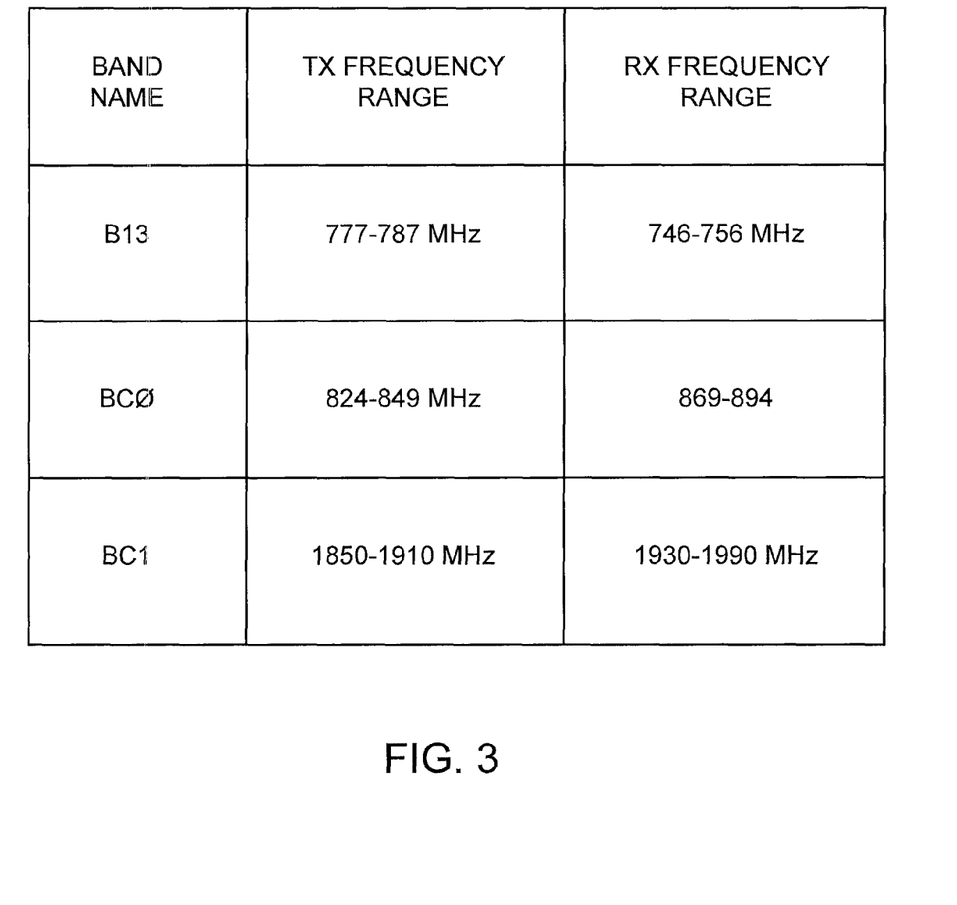
FIG. 3 is a table showing illustrative communications bands that may be handled using circuitry of the type shown in FIG. 2 in accordance with an embodiment of the present invention.

Consider, as an example, the illustrative communications bands shown in the table of FIG. 3. These bands, which may represent only a subset of the bands supported by wireless communications circuitry 34, may include LTE bands such as LTE Band 13 ("B13") for handling data communications, and CDMA 2000 bands such as Band Class 0 ("BC0") and Band Class 1 ("BC1"). As shown in the FIG. 3 table, each of these bands may have two associated sub-bands. For example, in band B13, signals may be transmitted in the range of 777 to 787 MHz (a first band sometimes referred to as band B13 TX) and signals may be received in the range of 746 to 756 MHz (a second band sometimes referred to as band 13 RX). In band BC0, the frequency range of 824 to 849 MHz may be associated with a transmit band (band BC0 TX) and the frequency range of 869 to 894 MHz may be associated with a receive band (band BC0 RX). Band BC1 may likewise include a transmit band (e.g., a band covering signal frequencies from 1850 to 1910 MHz that is sometimes referred to as band BC1 TX) and a receive band (e.g., a band covering signal frequencies from 1930 to 1990 MHz that is sometimes referred to as band BC1 RX).

In wireless communications circuits that support communications with the TX and RX bands associated with bands B13, BC0, and BC1, it can be challenging to route signals between an antenna and respective transmitters and receivers through front end circuitry 58 of FIG. 2 without interference. For example, it can be challenging to handle signals in the B13 TX band at 777 to 787 MHz simultaneously with the signals in the adjacent BC0 TX band at 824 to 849 MHz without creating intermodulation distortion (IMD) noise that affect other bands such as the BC0 RX band. In particular, noise in band BC0 RX may be produced by frequencies corresponding to the second harmonic of band BC0 TX minus the fundamental frequencies of band B13 TX.

Figure 4:
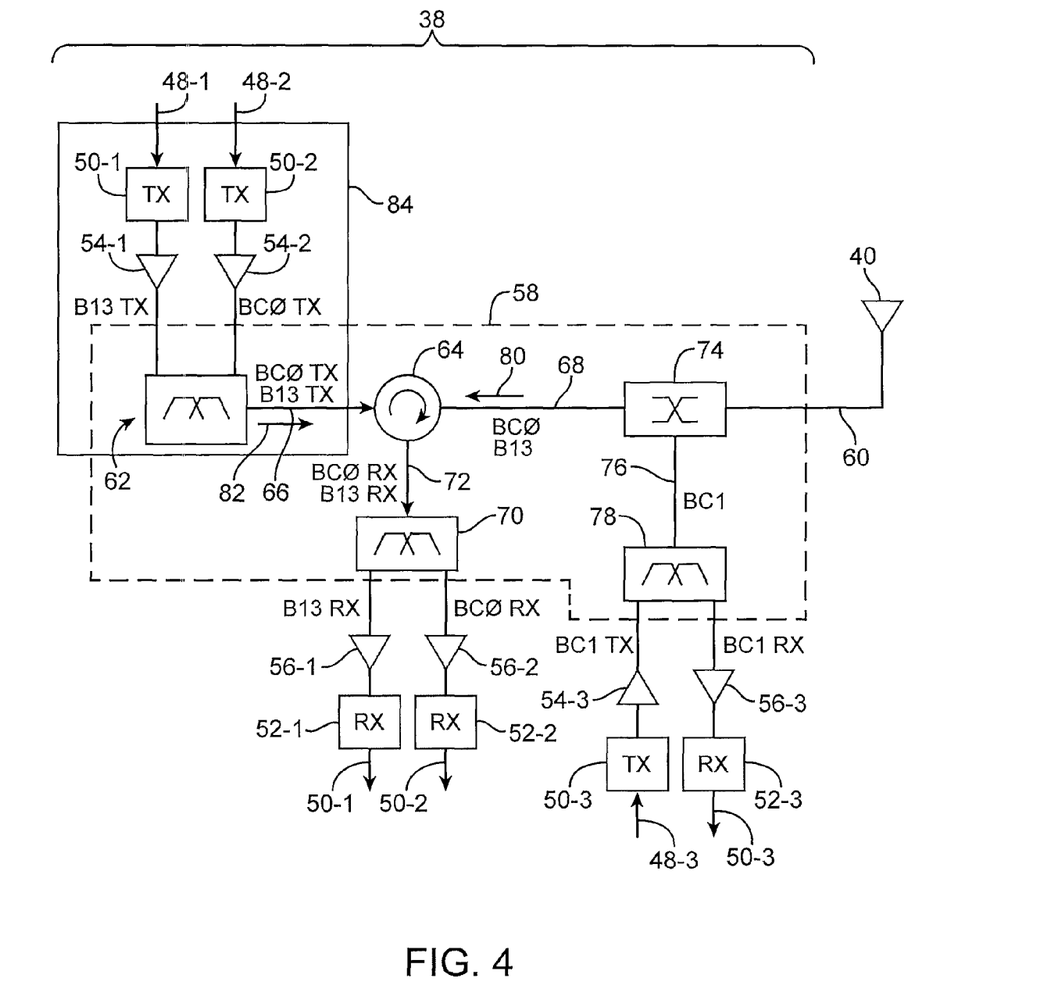
FIG. 4 is a circuit diagram of illustrative wireless communications circuitry of the type that may be used in a device such as the device of FIG. 1 while handling bands such as the bands of FIG. 3 in accordance with an embodiment of the present invention.

The close spacing and frequency interrelationships between these bands makes it possible for interference to be created by intermodulation distortion as signals pass through components such as filters that exhibit nonlinearities. The impact of this type of interference may be mitigated by satisfactory selection of circuitry for front-end module 58. Circuitry of the type that may be used in front-end module 58 or other filtering and switching circuitry that is interposed between an antenna and the transceiver circuitry of device 10 is shown in FIG. 4. The illustrative circuit configuration of FIG. 4 may help mitigate the impact of interference due to the simultaneous operation of multiple communications bands (e.g., voice and data bands).

As shown in FIG. 4, over-the-air radio-frequency signals may be received by antenna 40 and, using filter circuitry 58, may be routed to respective receivers 52-1, 52-2, and 52-3 and their associated output paths 50-1, 50-2, and 50-3 based on signal frequency. In this capacity, filter circuitry 58 serves as a demultiplexer circuit that separates out a multi-band antenna signal on path 60 into signals in respective bands. The received signals on paths 50-1, 50-2, and 50-3 may be provided to baseband circuit 46 (FIG. 2). Output signals from baseband circuit 46 may be provided to paths 48-1, 48-2, and 48-3. Respective transmitters 50-1, 50-2, and 50-3 may transmit output signals in different corresponding bands. During signal transmission, filter circuitry 58 may serve as a multiplexing circuit that combines the signals from each of the different bands and routes the resulting multi-band signal to antenna 40 for over-the-air transmission. The transceiver circuitry of transmitters 50-1, 50-2, and 50-3 and receivers 52-1, 52-2, and 52-3 may be implemented on one or more integrated circuits.

When receiving signals, low noise amplifiers 56-1, 56-2, and 56-3 may be used to increase signal strength. Each low noise amplifier and each associated receiver in transceiver circuitry 38 of FIG. 4 may handle signals in a different respective communications band. For example, signals in band B13 RX may be amplified and provided to receiver 52-1 using low noise amplifier 56-1, signals in band BC0 RX may be amplified and provided to receiver 52-2 using low noise amplifier 56-2, and signals in band BC1 RX may be amplified and provided to receiver 52-3 via low noise amplifier 56-3.

Transmitted signals may likewise be handled by different components in each respective output path. For example, transmitted signals in band B13 TX may be handled by transmitter 50-1 and corresponding power amplifier 54-1, transmitted signals in band BC0 TX may be handled by transmitter 50-2 and power amplifier 54-2, and transmitted signals in band BC1 TX may be handled by transmitter 50-3 and power amplifier 54-3.

Filter circuitry 58 may include components such as bandpass filters, low-pass filters, high-pass filters, diplexers, duplexers, circulators, etc. These components may include two ports (e.g., for bandpass filters), three ports (e.g., for diplexers, duplexers, circulators, and other such components), etc.

In configurations of the type shown in FIG. 4, diplexer filter 74 may be used to divide incoming signals on path 60 into paths 68 and 76 based on frequency. Received signals on path 60 may potentially include signals in bands BC1, BC0, and B13. Signals in bands BC1 and BC0 may, for example, correspond to voice telephone call signals, whereas signals in band B13 may correspond to data signals (as an example). After passing through diplexer 74 signals in band BC1 may be routed to path 76, whereas signals in bands BC0 and B13 may be routed to path 68. During transmission operations, signals in bands BC0 and B13 that are passed to diplexer 74 by path 68 are routed to path 60 and antenna 40 by diplexer 74 and signals in band BC1 that are passed to diplexer 74 by path 76 are routed to path 60 and antenna 40 by diplexer 74.

Duplexer 78 may be used to handle the RX and TX subbands associated with band BC1. Transmitted signals from power amplifier 54-3 in band BC1 TX may be routed by duplexer 78 to path 76. Received signals in band BC1 RX that are present on path 76 may be passed by duplexer 78 to low noise amplifier 56-3 and receiver 52-3.

Circulator 64 (which may be implemented using a ferromagnetic material, as an example) may have three ports. Circulator 64 may route signals that are flowing in direction 80 on path 68 (i.e., incoming signals in both band BC0 and band B13) to path 72 and duplexer 70. Duplexer 70 may route the signals in band B13 Rx from path 72 to low noise amplifier 56-1 and receiver 52-1 and may route the signals in band BC0 RX from path 72 to low noise amplifier 56-2 and receiver 52-2.

Duplexer 62 in circuitry 84 may be used to combine the transmitted signals from transmitters 50-1 and 50-2 onto path 66. In particular, duplexer 62 may route signals in band B13 TX from transmitter 50-1 and power amplifier 54-1 onto path 66 and may route signals in band BC0 TX from transmitter 50-2 and power amplifier 54-2 to path 66. Due to nonlinearities in duplexer 62, there is a potential for producing noise on path 66 due to intermodulation distortion when signals in BC0 TX and B13 TX are present simultaneously (e.g., when a voice call in band BC0 is being held at the same time as data is being conveyed using band B13 TX).

Transmitted signals on path 66 (i.e., signals in bands BC0 TX and B13 TX and any associated noise signals) that are flowing in direction 82 may be routed to path 68 and diplexer 74 by circulator 64. During these data transmission operations, the isolation provided by circulator 64 may ensure that minimal signal power will leak into path 72 (i.e., the power of the signal flowing on path 66 will be mostly coupled to path 68). The amount of power flowing in direction 82 on path 66 that leaks onto path 72 during signal transmission will typically be reduced by a factor of 5 dB or more, 10 dB or more, or 20 dB or more relative to the power on path 66 and path 68.

Because circulator 64 isolates receivers 52-1 and 50-2 from noise and other signals on path 66, the performance requirements for filter components such as duplexer 62 (or other such transmitter multiplexing circuitry) may be relaxed. For example, the filter architecture of FIG. 4 may allow duplexer 62 to exhibit nonlinearity. This nonlinearity might be reduced by fabricating duplexer 62 from a relatively large ceramic substrate (e.g., a ceramic substrate having a lateral dimension of over 1 cm), but this might result in an undesirably bulky size for device 10. When circulator 64 is present, noise from path 66 is prevented from reaching receivers 52-1 and 52-2, so duplexer 62 may be implemented using a less bulky ceramic diplexer arrangement than might otherwise be possible or may be implemented using a bulk acoustic wave design or other design that has the potential for producing more noise than would be tolerable without circulator 64.

If desired, circuitry 84 of FIG. 4 may be implemented using other components. For example, circuitry 84 may be implemented using bandpass filters and a combiner circuit as shown in FIG. 5 or using bandpass filters and a and a diplexer as shown in FIG. 6 (as examples).

Figure 5:
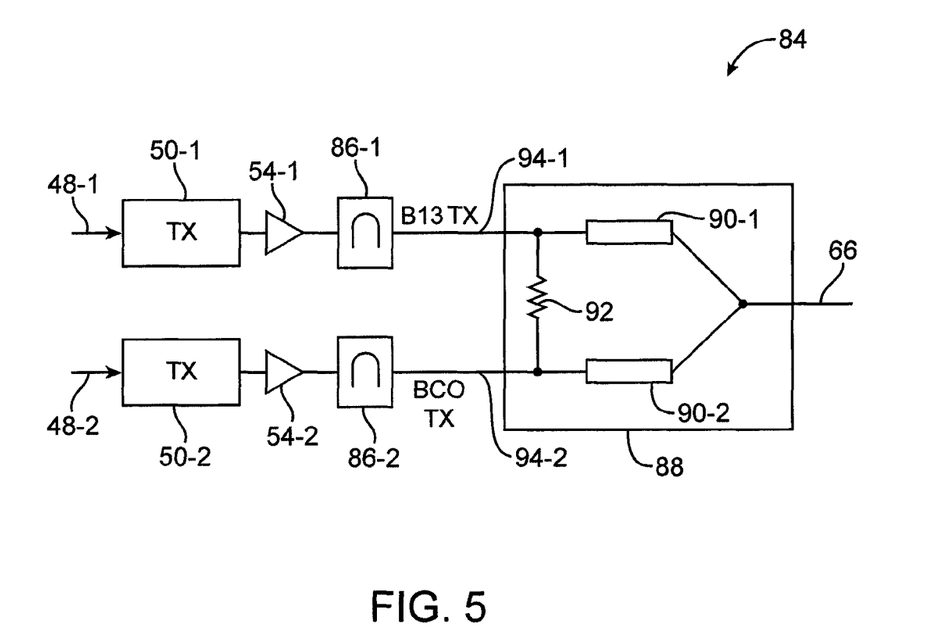
FIG. 5 is a diagram of illustrative transmitter circuitry based on a combiner circuit that may be used in wireless communications circuitry of the type shown in FIG. 4 in accordance with an embodiment of the present invention.

As shown in FIG. 5, circuitry 84 may include a first bandpass filter such as bandpass filter 86-1 and a second bandpass filter such as bandpass filter 86-2. Bandpass filter 86-1 may have a pass band that coincides with the signals being transmitted by transmitter 50-1 (i.e., the pass band of bandpass filter 86-1 may be centered on frequencies in the range of 777 to 787 MHz to coincide with band B13 TX in the example of FIG. 5). Bandpass filter 86-2 may have a pass band that coincides with the frequencies being transmitted by transmitter 50-2 (i.e., frequencies in the range of 824 to 849 MHz to coincide with band BC0 TX in the example of FIG. 5). Noise signals that fall outside of the pass bands of filters 86-1 and 86-2 will tend to be blocked by filters 86-1 and 86-2.

With a circuit configuration of the type shown in FIG. 1, signals in band B13 TX and signals from band BC0 TX are merged onto path 66 and are provided to circulator 64 (FIG. 4) for transmission over antenna 40. Path 94-1 may be used to route the output signals from bandpass filter 86-1 to a first input of combiner 88. Path 94-2 may be used to route the output signals from bandpass filter 86-2 to a second input of combiner 88. Combiner 88 may be formed from passive elements. For example, combiner 88 may be implemented using a Wilkinson splitter having a resistor such as resistor 92 that bridges paths 94-1 and 94-2 and transmission lines 90-1 and 90-2 that respectively route signals from paths 94-1 and 94-2 to path 66. Resistor 92 may have an impedance of 100 ohms and transmission lines 90-1 and 90-2 may each have an impedance of 50 ohms (as an example). Combiner 88 may exhibit a minimum loss of about 3 dB for signals in path 94-1 and for signals in path 94-2, but because combiner 88 may be implemented using passive elements, combiner 88 may exhibit minimal nonlinearity and therefore minimal noise due to nonlinearity.

Figure 6:
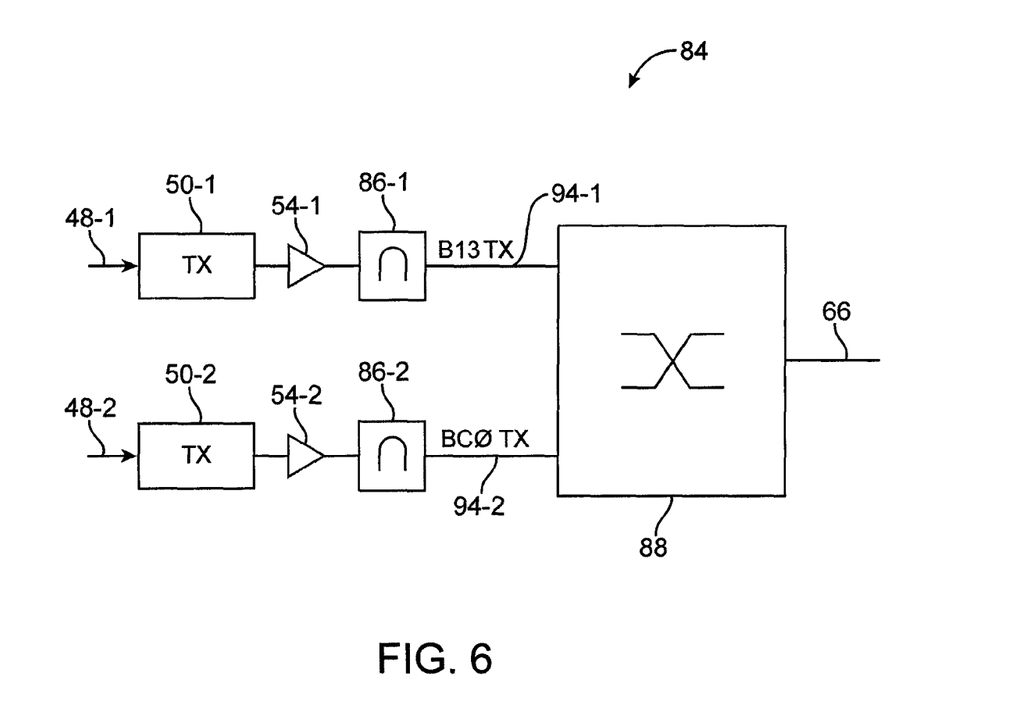
FIG. 6 is a diagram of illustrative transmitter circuitry based on a diplexer circuit and bandpass filters that may be used in wireless communications circuitry of the type shown in FIG. 4 in accordance with an embodiment of the present invention.

FIG. 6 shows an illustrative configuration that may be used for circuitry 84 of FIG. 4 in which signals on paths 94-1 and 94-2 are merged onto path 66 by a filter such as diplexer 88. Transmitter 50-1 may receive signals on path 48-1 and may pass corresponding output signals to power amplifier 54-1. Transmitter 50-2 may receive signals on path 48-2 and may pass corresponding output signals to power amplifier 54-2. The signals at the output of amplifier 54-1 may be associated with band B13 TX and the signals at the output of amplifier 54-2 may be associated with band BC0 TX (in the FIG. 6 example), so bandpass filter 86-1 may be configured to have a pass band centered around band B13 TX and bandpass filter 86-2 may be configured to have a pass band centered around band BC0 TX.

Diplexer 88 may receive the signals in band B13 TX on path 94-1 and may receive the signals in band BC0 TX on path 94-2 and may combine these signals onto output path 66. The signals on path 66 may be provided to circulator 64 (FIG. 4) for transmission over antenna 40. Diplexer 88 may be implemented using any suitable filter technology (e.g., as a bulk acoustic wave device, as a surface acoustic wave device, as a device based on a ceramic substrate, etc.). Because circulator 64 helps isolate receivers such as receivers 52-1 and 52-2 from noise on path 66, diplexer 88 may be implemented using a design that generates some noise due to intermodulation distortion while still permitting transceiver circuitry 38 to function properly during simultaneous voice and data communications.

The foregoing is merely illustrative of the principles of this invention and various modifications can be made by those skilled in the art without departing from the scope and spirit of the invention. The foregoing embodiments may be implemented individually or in any combination.

What is claimed is:

1. Wireless communications circuitry configured to operate in different communications bands without producing excessive interference between the different communications bands, comprising:
    a first radio-frequency transmitter that operates in a first transmit communications band;
    a second radio-frequency transmitter that operates in a second transmit communications band;
    a radio-frequency receiver that operates in a receive communications band;
    an antenna that is shared by the first and second radio-frequency transmitters and the radio-frequency receiver;
    a circulator;
    a first path coupled between a first port of the circulator and the antenna, wherein the first path conveys signals in the first transmit communications band, the second transmit communications band, and the receive communications band;
    a second path coupled between a second port of the circulator and the radio-frequency receiver that conveys signals in the receive communications band; and
    a third path coupled to a third port of the circulator that conveys signals in the first and second transmit communications bands, wherein the circulator is configured to route the signals in the first and second transmit communications bands from the third path to the first path, to route the signals in the receive communications band from the first path to the second path, and to isolate the radio-frequency receiver from noise on the third path.

2. The wireless communications circuitry defined in claim 1 further comprising a duplexer, wherein the first radio-frequency transmitter is coupled to the duplexer, wherein the second radio-frequency transmitter is coupled to the duplexer, and wherein the duplexer is coupled to the circulator by the third path.

3. The wireless communications circuitry defined in claim 2 wherein the first transmit communications band has a frequency range of 777 to 787 MHz and wherein the first radio-frequency transmitter is configured to transmit radio-frequency signals in a frequency range of 777 to 787.

4. The wireless communications circuitry defined in claim 3 wherein the second transmit communications band has a frequency range of 824 to 849 MHz and wherein the second radio-frequency transmitter is configured to transmit radio-frequency signals in a frequency range of 824 to 849 MHz.

5. The wireless communications circuitry defined in claim 4 wherein the receive communications band has a frequency range of 869 to 894 MHz and wherein the radio-frequency receiver is configured to receive radio-frequency signals in a frequency range of 869 to 894 MHz.

6. The wireless communications circuitry defined in claim 1 further comprising a diplexer interposed between the circulator and the antenna, wherein the diplexer has first, second, and third ports, wherein the first diplexer port is coupled to the antenna, wherein the second diplexer port is coupled to the first path, and wherein the third diplexer port is coupled to a filter.

7. The wireless communications circuitry defined in claim 6 wherein the filter comprises a duplexer.

8. The wireless communications circuitry defined in claim 7 further comprising a third radio-frequency transmitter that is coupled to the duplexer and an additional radio-frequency receiver that is coupled to the duplexer.

9. The wireless communications circuitry defined in claim 8 further comprising an additional duplexer that is coupled between the second path and the radio-frequency receiver.

10. The wireless communications circuitry defined in claim 6 wherein the filter comprises a first duplexer and wherein the wireless communications circuitry further comprises:
    a second duplexer that is coupled between the second path and the radio-frequency receiver; and a third duplexer, wherein the first radio-frequency transmitter is coupled to the third duplexer, wherein the second radio-frequency transmitter is coupled to the third duplexer, and wherein the third duplexer is coupled to the circulator by the third path.

11. The wireless communications circuitry defined in claim 1 further comprising a combiner, wherein the first radio-frequency transmitter is coupled to the combiner, wherein the second radio-frequency transmitter is coupled to the combiner, and wherein the combiner has a port on which signals from the first and second radio-frequency transmitters are provided to the third path.

12. The wireless communications circuitry defined in claim 11 wherein the combiner comprises a Wilkinson splitter.

13. The wireless communications circuitry defined in claim 12 further comprising a first bandpass filter interposed between the first radio-frequency transmitter and the Wilkinson splitter and a second bandpass filter interposed between the second radio-frequency transmitter and the Wilkinson splitter.

14. The wireless communications circuitry defined in claim 1 further comprising a diplexer, wherein the first radio-frequency transmitter is coupled to the diplexer, wherein the second radio-frequency transmitter is coupled to the diplexer, and wherein the diplexer has a port on which signals from the first and second radio-frequency transmitters are provided to the third path.

15. The wireless communications circuitry defined in claim 14 further comprising a first bandpass filter interposed between the first radio-frequency transmitter and the diplexer and a second bandpass filter interposed between the second radio-frequency transmitter and the diplexer.

16. Wireless communications circuitry, comprising:
first, second, and third radio-frequency transmitter circuits that operate in first, second, and third transmit communications bands, respectively;
first, second, and third radio-frequency receiver circuits that operate in first, second, and third receive communications bands, respectively;
an antenna that is shared by the first, second, and third radio-frequency transmitter circuits and the first, second, and third radio-frequency receiver circuits; and
a circulator that has a first port that receives signals in the first and second transmit communications bands from the first and second radio-frequency transmitter circuits, a second port that is coupled to the antenna, and a third port through which the first and second receiver circuits receive signals in the first and second receive communications bands, wherein the circulator is configured to route the signals in the first and second transmit communications bands from the first port to the second port, to route signals in the first and second receive communications bands from the second port to the third port, and to isolate the first and second radio-frequency receiver circuits from noise at the first port of the circulator.

17. The wireless communications circuitry defined in claim 16 further comprising a diplexer that is coupled between the antenna and the second port, wherein the diplexer receives signals in the third transmit communications band from the third radio-frequency transmitter and provides signals in the third receive communications band to the third radio-frequency receiver.

18. The wireless communications circuitry defined in claim 17 further comprising a first duplexer, a second duplexer, and a third duplexer, wherein the third radio-frequency transmitter transmits signals in the third transmit communications band to the diplexer through the first duplexer, wherein the third radio-frequency receiver receives signals in the third receive communications band from the diplexer through the first duplexer, wherein the first and second radio-frequency transmitters transmit signals in the first and second transmit communications band to the first port of the circulator through the second duplexer, and wherein the first and second radio-frequency receivers receive signals in the first and second receive communications band from the third port of the circulator through the third duplexer.

19. Wireless communications circuitry, comprising:
a plurality of transmitters that transmits radio-frequency signals in respective transmit communications bands;
a receiver that operates in a receive communications band;
an antenna through which the radio-frequency signals are transmitted;
a filter that receives the radio-frequency signals in the transmit communications bands from the plurality of transmitters and that combines the radio-frequency signals received from the plurality of transmitters to produce merged signals; and
a circulator having a first port that receives the merged radio-frequency signals from the filter, a second port that is coupled to the antenna, and a third port through which signals in the receive communications band are routed to the receiver, wherein the circulator is configured to route the merged signals from the first port to the second port, to route signals in the receive communications band from the second port to the third port, and to isolate the receiver from noise at the first port of the circulator.

20. The wireless communications circuitry defined in claim 19 further comprising:
a diplexer that is coupled between the circulator and the antenna; and
an additional receiver that is coupled to the diplexer, wherein the diplexer routes incoming signals from the antenna to the circulator and routes additional incoming signals from the antenna to the additional receiver.

* * * * *

UNITED STATES PATENT AND TRADEMARK OFFICE
CERTIFICATE OF CORRECTION

PATENT NO. : 8,432,836 B2  Page 1 of 1
APPLICATION NO. : 12/942937
DATED : April 30, 2013
INVENTOR(S) : Louie J. Sanguinetti It is certified that error appears in the above-identified patent and that said Letters Patent is hereby corrected as shown below:

In the Claims

In claim 18, column 12, lines 19-20, delete "the first and second transmit communications band" and insert -- the first and second transmit communications bands --

In claim 18, column 12, line 23, delete "the first and second receive communications band" and insert -- the first and second receive communications bands --

Signed and Sealed this
Seventeenth Day of September, 2013

Teresa Stanek Rea
*Deputy Director of the United States Patent and Trademark Office*